United States Patent
Hawari et al.

(10) Patent No.: US 10,917,650 B2
(45) Date of Patent: Feb. 9, 2021

(54) RESILIENT TRANSMISSION OF RAW VIDEO STREAMS OVER AN IP COMMUNICATION NETWORK

(71) Applicant: Cisco Technology, Inc., San Jose, CA (US)

(72) Inventors: Mohammed Hawari, Montigny-le-Bretonneux (FR); Yoann Desmouceaux, Paris (FR); Marcel Enguehard, Paris (FR); Aloÿs C. Augustin, Versailles (FR); Andre Surcouf, St Leu la Foret (FR)

(73) Assignee: Cisco Technology, Inc., San Jose, CA (US)

( * ) Notice: Subject to any disclaimer, the term of this patent is extended or adjusted under 35 U.S.C. 154(b) by 218 days.

(21) Appl. No.: 16/033,112

(22) Filed: Jul. 11, 2018

(65) Prior Publication Data

US 2020/0021821 A1     Jan. 16, 2020

(51) Int. Cl.
*H04N 19/182* (2014.01)
*H04N 19/172* (2014.01)
*H04L 29/06* (2006.01)
*H04N 21/435* (2011.01)
(Continued)

(52) U.S. Cl.
CPC ....... *H04N 19/182* (2014.11); *H04L 65/4084* (2013.01); *H04L 65/608* (2013.01); *H04L 65/80* (2013.01); *H04N 19/172* (2014.11); *H04N 19/40* (2014.11); *H04N 21/435* (2013.01); *H04N 21/462* (2013.01)

(58) Field of Classification Search
CPC ........ G06T 2207/20224; H04N 19/172; H04N 19/182; H04N 19/40; H04N 21/435; H04L 65/608
See application file for complete search history.

(56) References Cited

U.S. PATENT DOCUMENTS 6,282,684 B1   8/2001   Kondo et al.
7,221,761 B1   5/2007   Deshpande et al.
(Continued)

OTHER PUBLICATIONS

Chen, Guanrong, Mao, Yaobin, et Chui, Charles K. A symmetric image encryption scheme based on 3D chaotic cat maps. Chaos, Solitons & Fractals, 2004, vol. 21, No. 3, p. 749-761.
(Continued)

*Primary Examiner* — Obafemi O Sosanya
(74) *Attorney, Agent, or Firm* — Patterson + Sheridan, LLP

(57) ABSTRACT

Systems, methods, and computer program products relating to resilient transmission of a media stream over a communication network. A plurality of data packets are received over a communications network. The plurality of data packets relate to a first source video portion transformed using a geometric transform. The geometric transform is configured to modify a location of pixels in the first source video portion such that a plurality of adjacent pixels in the first source video portion are not adjacent after transformation. A received video portion is assembled based on the plurality of data packets. The received video portion is transformed, using an inverse of the geometric transform, to generate a second source video portion. The second source video portion and the first source video portion include a plurality of matching pixels.

19 Claims, 7 Drawing Sheets

(51) Int. Cl.
*H04N 21/462* (2011.01)
*H04N 19/40* (2014.01)

(56) References Cited

U.S. PATENT DOCUMENTS

| | | | | |
|---|---|---|---|---|
| 2002/0048322 | A1* | 4/2002 | Yamamoto | H04N 5/4401 375/240.12 |
| 2004/0202326 | A1 | 10/2004 | Chen et al. | |
| 2007/0139248 | A1* | 6/2007 | Baharav | G01S 13/89 342/22 |
| 2011/0310296 | A1* | 12/2011 | Lee | G09G 5/008 348/539 |
| 2011/0317918 | A1* | 12/2011 | Guerreiro | H04N 1/6027 382/167 |
| 2015/0195578 | A1* | 7/2015 | Chen | H04N 19/30 375/240.26 |
| 2016/0227248 | A1* | 8/2016 | Choi | H04N 19/29 |

OTHER PUBLICATIONS

Guan, Zhi-Hong, Huang, Fangjun, et Guan, Wenjie. Chaos-based image encryption algorithm. Physics Letters A, 2005, vol. 346, No. 1, p. 153-157.

Pareek, Narendra K., Patidar, Vinod, et Sud, Krishan K. Image encryption using chaotic logistic map. Image and vision computing, 2006, vol. 24, No. 9, p. 926-934.

Rawat, Sanjay et Raman, Balasubramanian. A chaotic system based fragile watermarking scheme for image tamper detection. AEU-International Journal of Electronics and Communications, 2011, vol. 65, No. 10, p. 840-847.

Tokunbo Ogunfunmi, "Implementation of a 3-D Flexiible Macroblock Ordering for H.264/AVC," Santa Clara University, 32 pages [Accessed Online Jul. 11, 2018] <http://www.ti.com/lit/ml/sprp512/sprp512.pdf>.

Stephan Wenger, "FMO: Flexible Macroblock Ordering," Joint Video Team 3rd Meeting, May 6-10, 2002, 22 pages.

Lambert et al., Flexible Macroblock ordering in H.264/AVC, Journal of Visual Communication and Image Representation, vol. 17, Issue 2, Apr. 2006, pp. 358-375 (Abstract Only).

L. Gharai and C. Perkins, "RTP Payload Format for Uncompressed Video," University of Glasgow, Sep. 2005, 18 pages.

Piquer et al., "Fighting Packet Loss on IP Video Streams," LANC '07, Oct. 10-11, 2007, ACM 978-1-59593-907-4/07/0010, 8 pages.

Manjunath Prasad and K.L.Sudha, "Chaos Image Encryption using Pixel shuffling," Computer Science & Information Technology, DOI: 10.5121/csit.2011.1217, 11 pages.

* cited by examiner

US 10,917,650 B2

RESILIENT TRANSMISSION OF RAW VIDEO STREAMS OVER AN IP COMMUNICATION NETWORK

TECHNICAL FIELD

Embodiments presented in this disclosure generally relate to resilient transportation of media streams over Internet Protocol (IP) networks.

BACKGROUND

Uncompressed media, including video, can be transported over IP Networks. For example, raw video can be transported over an IP Network in a studio or video production environment. Generally, it has been assumed that this transportation occurs over a fully lossless network. Reliability is either not dealt with, or ensured by complete replication of the target media stream. But neither solution is satisfactory. Complete replication of the target media stream is very wasteful in terms of network resources.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DESCRIPTION OF EXAMPLE EMBODIMENTS

Overview

Figure 1:
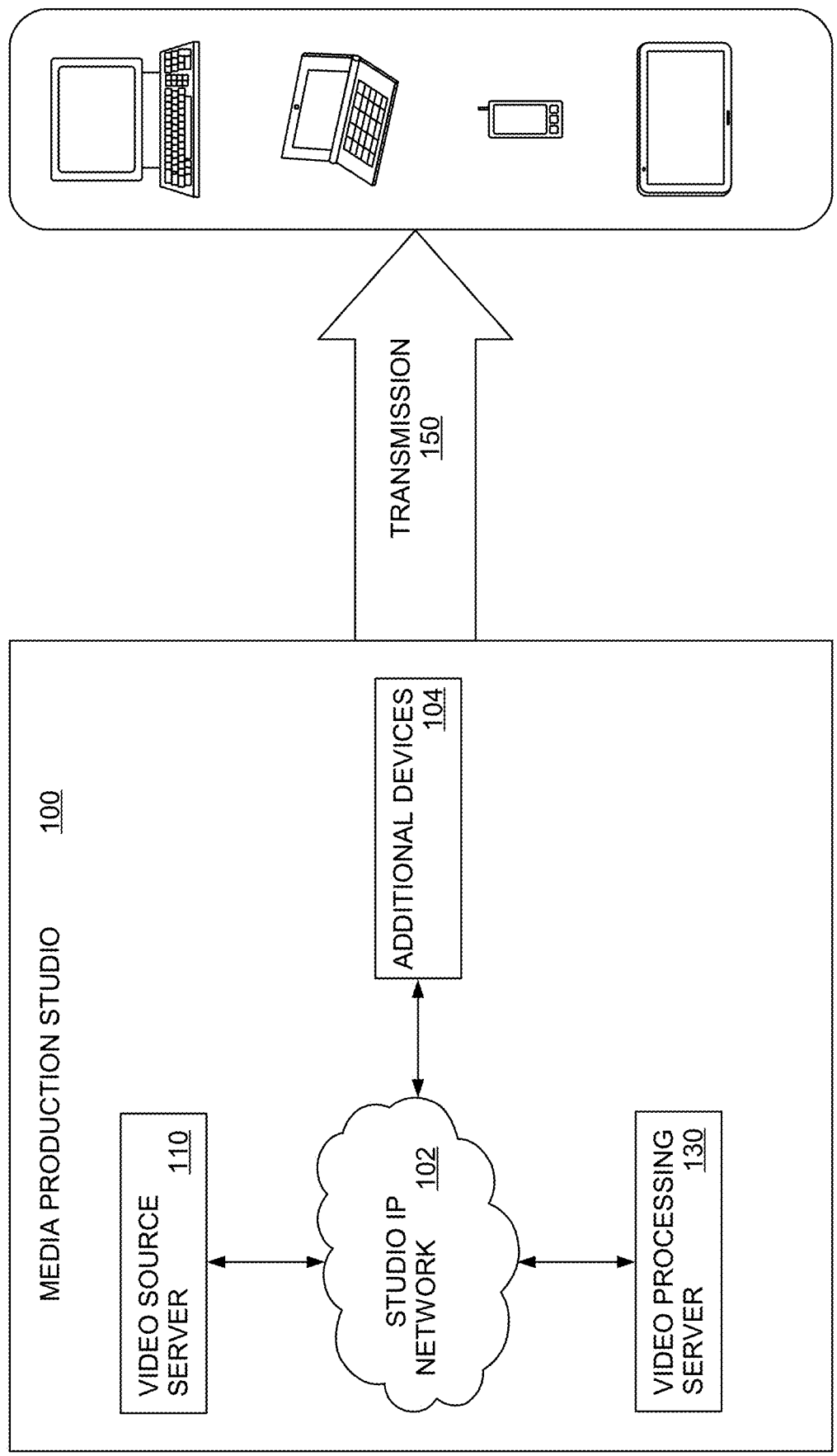
FIG. 1 is an illustration of a media production studio environment, according to embodiments.

Embodiments described herein include a method for resilient transmission of a media stream over a communication network. The method includes receiving a plurality of data packets over a communications network, the plurality of data packets relating to a first source video portion transformed using a geometric transform. The geometric transform is configured to modify a location of pixels in the first source video portion such that a plurality of adjacent pixels in the first source video portion are not adjacent after transformation. The method further includes assembling a received video portion based on the plurality of data packets. The method further includes transforming the received video portion, using an inverse of the geometric transform, to generate a second source video portion. The second source video portion and the first source video portion include a plurality of matching pixels.

Embodiments described herein further include a system. The system includes a processor and a memory storing a program, which, when executed on the processor, performs an operation. The operation includes receiving a plurality of data packets over a communications network, the plurality of data packets relating to a first source video portion transformed using a geometric transform. The geometric transform is configured to modify a location of pixels in the first source video portion such that a plurality of adjacent pixels in the first source video portion are not adjacent after transformation. The operation further includes assembling a received video portion based on the plurality of data packets. The operation further includes transforming the received video portion, using an inverse of the geometric transform, to generate a second source video portion. The second source video portion and the first source video portion include a plurality of matching pixels.

Embodiments described herein further include a computer program product for resilient transmission of a media stream over a communication network. The computer program product includes a computer-readable storage medium having computer-readable program code embodied therewith, the computer-readable program code executable by one or more computer processors to perform an operation. The operation includes receiving a plurality of data packets over a communications network, the plurality of data packets relating to a first source video portion transformed using a geometric transform. The geometric transform is configured to modify a location of pixels in the first source video portion such that a plurality of adjacent pixels in the first source video portion are not adjacent after transformation. The operation further includes assembling a received video portion based on the plurality of data packets. The operation further includes transforming the received video portion, using an inverse of the geometric transform, to generate a second source video portion. The second source video portion and the first source video portion include a plurality of matching pixels.

EXAMPLE EMBODIMENTS

According to one or more embodiments herein, resilient transmission of a raw video stream allows for improved error recovery if packets are lost during transmission. Video over IP is often transmitted as a set of consecutive scan lines. A given video frame can be defined by a sequence of packets, a packet containing data for the pixels of the current frame. The packets are sent sequentially, representing the consecutive scan lines.

Errors during transmission can cause lost packets. Such errors are commonly related to a network event (e.g., congestion, buffer overrun, etc.). This can induce the loss of many consecutive packets, sometimes referred to as "burst" loss. If video is transmitted as a series of consecutive scan lines, the loss of consecutive packets can lead to the loss of a large portion of the video frame. This can create an apparent "hole" in the image.

For example, uncompressed video can be transported over IP networks using the Real-time Transport Protocol (RTP). In this example, a sequence of constant size IP packets is sent from the source to the destination, a packet containing data related to pixels in the current frame. A given frame in the uncompressed video is defined by a sequence of packets ending with a packet with the RTP marker bit set, which means the end of the current frame. The RTP header also contains a sequence number incremented for each packet to ensure the continuity of the stream. In case of packet loss, the current frame is dropped.

In the media production environment, the transmission medium (e.g., Ethernet cable or fiber) is often assumed to be reliable. In this environment, packet losses are more likely a consequence of a buffer overrun or switching error, rather than a breakdown in the transportation medium. This makes burst loss more likely in this environment—when one packet is lost, it is likely that one or more surrounding packets were also lost.

According to one or more embodiments herein, a transform (e.g., a geometric transform) can be applied to a frame of uncompressed video data before the frame is transported over the IP network. This transform scatters pixels across a variety of packets, so that a given packet contains relatively fewer pixels located near each other in the source frame. In the event packets are lost, the image data for lost pixels can be more easily recovered, by recovering the value of a lost pixel based on data about the surrounding pixels. Since a lost packet will mean lost pixels spread throughout the image, instead of a section of lost pixels located near each other, surrounding pixel data is more likely to be available for the lost pixels and the image data can be recovered.

Further, according to one or more embodiments herein, these techniques can facilitate insertion of supplemental content into the raw video stream. For example, a banner or logo is sometimes inserted into a live video stream (e.g., a score banner or sponsor logo in a sporting event). In an embodiment, the transform can be applied to both the raw base video stream and the supplemental content, separately, facilitating error recovery of the combined, final, stream. Alternatively, the combined final video image could be created using the base stream and the supplemental content, and the transform could be applied to the final video image. One or more embodiments illustrated in this disclosure discuss resilient transmission of video streams. It should be understood that these video streams could include audio as well, and that the video could be a live feed or pre-recorded.

FIG. 1 is an illustration of a media production studio environment, according to embodiments. A media production studio 100 includes a video source server 110, a video processing server 130, and additional devices 104. The video source server 110, the video processing server 130, and the additional devices 104 are in communication via a studio IP network 102. The video source server 110 is generally configured to provide a source video stream. It is discussed in more detail with regard to FIG. 2. The video processing server 130 is generally configured to process video received from the video source server 110. It is also discussed in more detail with regard to FIG. 2. The additional devices 104 are additional devices within the media production studio 100, including cameras, additional source devices, editing devices, display devices, video and audio processing devices, etc.

In an embodiment, the studio IP network 102 is a wired local area network with assumed reliable transportation channels, for example Ethernet cables or fiber optic cables. But this is merely an example. The studio IP network 102 can be any suitable communication network, including the Internet, a local access network, a mesh network, or a wide access network. The studio IP network 102 can use any suitable communication protocol, including any suitable wired or wireless protocol. For example, studio IP network 102 can use an IEEE Wi-Fi standard, like an 802.11 standard, cellular protocols (including 3G, LTE, 4G and others), and Bluetooth. As illustrated in FIG. 1, the studio IP network 102 is an Internet Protocol network. But this is merely an example for illustration purposes. Alternatively, the studio IP network 102 can use any other suitable protocol.

The media production studio 100 generally includes components configured to transmit a media stream to viewers 160. The transmission 150 can be a real-time live transmission, or a recorded transmission. The transmission 150 can use any suitable transmission method, including wireless transmission (e.g., an over-the-air television broadcast, a satellite television broadcast, or a wireless IP transmission), wired transmission (e.g., a cable television broadcast or a wired IP transmission), or any other suitable transmission method. The viewers 160 can view the media stream on any suitable device, including a television, a computer, a smartphone, a tablet, etc. Alternatively, the media stream can be stored, at the media production studio or elsewhere, including in a cloud storage environment. The stored media stream can then be transmitted later, or provided to viewers in a recorded medium (e.g., a recorded disk or drive). Further, the media stream can be provided to media partners (e.g., television station affiliates or streaming partners) instead of directly to viewers.

Figure 2:
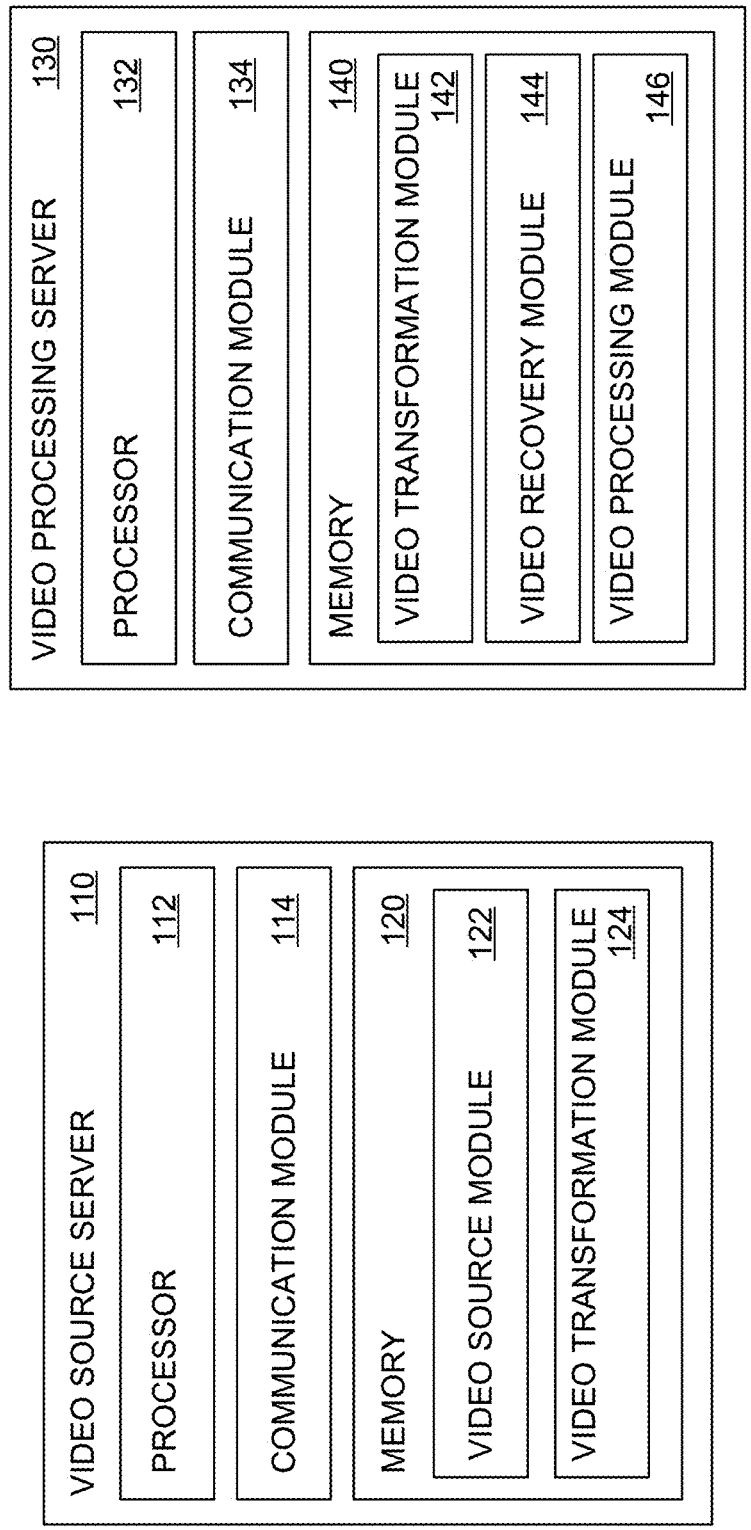
FIG. 2 is a block diagram illustrating a video source server and a video processing server, according to embodiments.

FIG. 2 is a block diagram illustrating a video source server 110 and a video processing server 130, according to embodiments. The video source server 110 includes a processor 112. The processor 112 generally retrieves and executes programming instructions stored in the memory 120. The processor 112 is included to be representative of a single central processing unit (CPU), multiple CPUs, a single CPU having multiple processing cores, graphics processing units (GPUs) having multiple execution paths, and the like. The memory 120 is generally included to be representative of electronic storage of any suitable type(s), including random access memory or non-volatile storage.

The video source server 110 further includes a communication module 114. The communication module 114 facilitates communication with other components within a media production studio environment 100, for example using the studio IP network 102. The communication module 114 can include all hardware and software components necessary to this communication, including one or more antennas, one or more transceivers, and associated controllers and software modules.

The memory 120 generally includes program code for performing various functions related to transmission of a media stream. The program code is generally described as various functional "applications," "components," or "modules" within the memory 120, although alternate implementations may have different functions and/or combinations of functions. Within the memory 120, the video source module 122 is generally configured to receive or generate a source video stream. For example, the video source module 122 can receive source video from one or more cameras and generate a video stream. As another example, the video source module 122 can receive video from a recorded source and generate a video stream. These are merely examples, and any suitable video source can be used. In an embodiment, the video stream is an uncompressed video stream intended for transmission within a media production studio (e.g., the media production studio 100 illustrated in FIG. 1). Alternatively, the video stream can be a compressed video stream, or any other suitable video stream.

The video transformation module 124 is generally configured to transform the video stream from the video source module 122 to facilitate resilient transmission of the video over a communication network. For example, the video transformation module 124 can perform a geometric transformation on video frames within the video stream to facilitate correction of transmission errors. This is discussed in more detail with regard to FIGS. 3-7.

The video processing server 130 includes a processor 132. The processor 132 generally retrieves and executes programming instructions stored in the memory 140. The processor 132 is included to be representative of a single CPU, multiple CPUs, a single CPU having multiple processing cores, GPUs having multiple execution paths, and the like. The memory 120 is generally included to be representative of electronic storage of any suitable type(s), including random access memory or non-volatile storage.

The video processing server 130 further includes a communication module 134. The communication module 134 facilitates communication with other components within a media production studio environment 100, for example using the studio IP network 102. The communication module 134 can include all hardware and software components necessary to this communication, including one or more antennas, one or more transceivers, and associated controllers and software modules.

The memory 140 generally includes program code for performing various functions related to transmission of a media stream. The program code is generally described as various functional "applications," "components," or "modules" within the memory 140, although alternate implementations may have different functions and/or combinations of functions. Within the memory 140, the video processing module 146 is generally configured to process a video stream (e.g., a video stream received from the video source server 110 via the studio IP network 102). For example, the video processing module 146 is generally configured to add (or remove) banners, logos, and the like from the video stream. This is discussed in more detail with regard to FIG. 7.

The video transformation module 142 is generally configured to transform a video stream to facilitate resilient transmission of the video over a communication network (e.g., over the studio IP network 102). This is discussed in more detail with regard to FIGS. 3-7. In an embodiment, the video transformation module 142 in the video processing server 130 is configured similarly to the video transformation module 124 in the video source server 110. In another embodiment, the video transformation module 142 is configured differently from the video transformation module 124 (e.g., using a different transformation).

The video recovery module 144 is generally configured to receive a video stream, recreate the video signal, and correct for any errors. For example, the video transformation module 124 can perform a transformation on a video signal before the communication module 114 transmits the signal over a network (e.g., transmits a packetized signal over the studio IP network 102). The video recovery module 144 can receive that signal and perform an inverse of the transformation to recover the original signal. The video recovery module 144 can also correct for any transmission errors (e.g., from lost packets during transmission). This is discussed in more detail with regard to FIGS. 3-6. The video source server 110 and video processing server 130 are illustrated as separate servers with separate software modules. This is merely for purposes of illustration. The techniques described in one or more embodiments herein could be performed using more, or fewer servers, and using more, or fewer, software modules.

Figure 3:
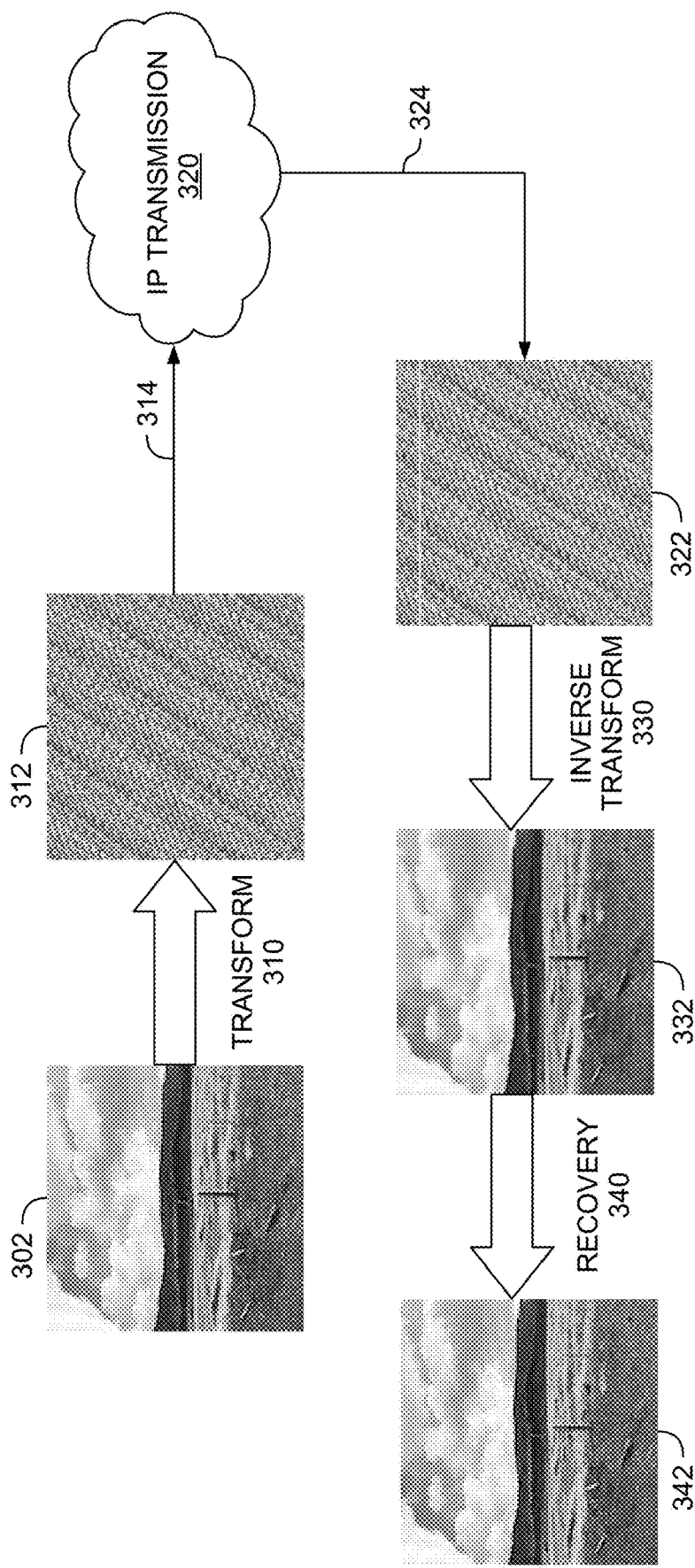
FIG. 3 is an illustration of transportation of a video stream over an IP network with packet loss, according to embodiments.

FIG. 3 is an illustration of transportation of a video stream over an IP network with packet loss, according to embodiments. The video source module (e.g., the video source module 122) selects the next video frame 302 for transmission (e.g., for transmission over the studio IP network 102 to the video processing server 130). The video transformation module (e.g., the video transformation module 124) applies a transform 310 to the video frame 302 and generates a transformed video frame 312. As discussed further with regard to FIGS. 5 and 6, in an embodiment the transform 310 can be a geometric transformation. As one example, the transform can be the linear Arnold's Cat Map transformation. Alternatively, another transform could be used. In an embodiment, the transform is selected to increase the minimum distance between two adjacent pixels, so that pixels which were adjacent in the source video frame 302 are now spread apart in the transformed video frame 312.

The transformed video frame 312 is packetized and transmitted, in the transmission 314, as part of an IP transmission 320. For example, the transformed video frame 312 could be transmitted using RTP such that the pixels in the transformed video frame 322 are distributed sequentially across packets during the transmission 314. During the transmission 324, however, one of the packets is lost. The destination (e.g., the video processing server 130) receives the various packets and re-creates the frame 322. But the re-created frame 322 is missing the data in the lost packets, as illustrated by the blank white line in the re-created frame 322.

A video recovery module (e.g., the video recovery module 144) performs the inverse transform 330, generating the frame 332. In an embodiment, the inverse transform 330 is the inverse of the transform 310, such that transforming the re-created frame 322 results in the original source frame 302 (assuming all data has been transmitted successfully). As illustrated in the frame 332, the data lost from the lost packet during the transmission 324 is now distributed across the frame 332 (after the inverse transformation), rather than being concentrated in one area as in the frame 322.

The video recovery module (e.g., the video recovery module 144) performs a recovery process 340 on the frame 332 to generate the frame 342. As discussed in more detail with regard to FIG. 5, information about a missing pixel can often be recovered based on information about the pixels surrounding the lost pixel. For example, the color and luma data for a given pixel can often be estimated based on the color and luma data of the surrounding pixels. Because the data lost during the transmission 324 is spread across the frame 332, the video recovery module 144 can estimate the values of the missing pixels and recover the frame 342.

Figure 4:
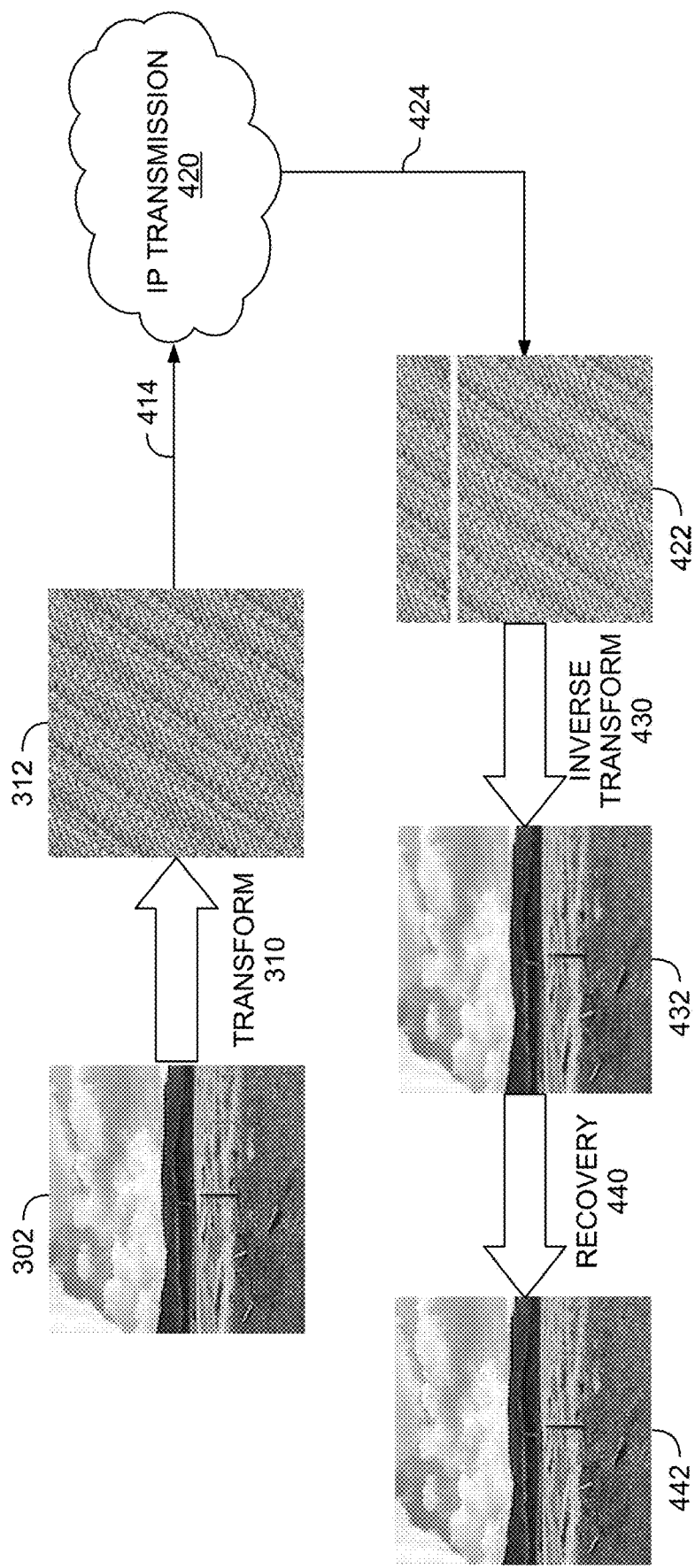
FIG. 4 is an illustration of transportation of a video stream over an IP network with further packet loss, according to embodiments.

FIG. 4 is an illustration of transportation of a video stream over an IP network with further packet loss, according to embodiments. Just as in FIG. 3, the video source module (e.g., the video source module 122) selects the next video frame 302 for transmission (e.g., for transmission over the studio IP network 102 to the video processing server 130). The video transformation module (e.g., the video transformation module 124) applies a transform 310 to the video frame 302 and generates a transformed video frame 312. The transformed video frame 312 is packetized and transmitted, in the transmission 414, as part of an IP transmission 420. This is discussed in more detail with regard to FIG. 3, and will not be repeated here.

During the transmission 424, however, multiple consecutive packets are lost. The destination (e.g., the video processing server 130) receives the various packets and re-creates the frame 422. But the re-created frame 422 is missing the data in the lost packets, as illustrated by the thicker blank white line in the re-created frame 422. The video recovery module (e.g., the video recovery module 144) performs the inverse transform 430, generating the frame 432. In an embodiment, the inverse transform 430 is the inverse of the transform 310, such that transforming the re-created frame 422 results in the original source frame 302 (assuming all data has been transmitted successfully). As illustrated in the frame 432, the data lost from the lost packets during the transmission 424 is now distributed across the frame 432 (after the inverse transformation), rather than being concentrated in one area as in the frame 422.

The video recovery module (e.g., the video recovery module 144) performs a recovery process 440 on the frame 432 to generate the frame 442. As discussed in more detail with regard to FIG. 5, information about a missing pixel can often be recovered based on information about the pixels surrounding the lost pixel. Because the data lost during the transmission 424 is spread across the frame 432, the video recovery module 144 can estimate the values of the missing pixels and recover the frame 442.

Figure 5:
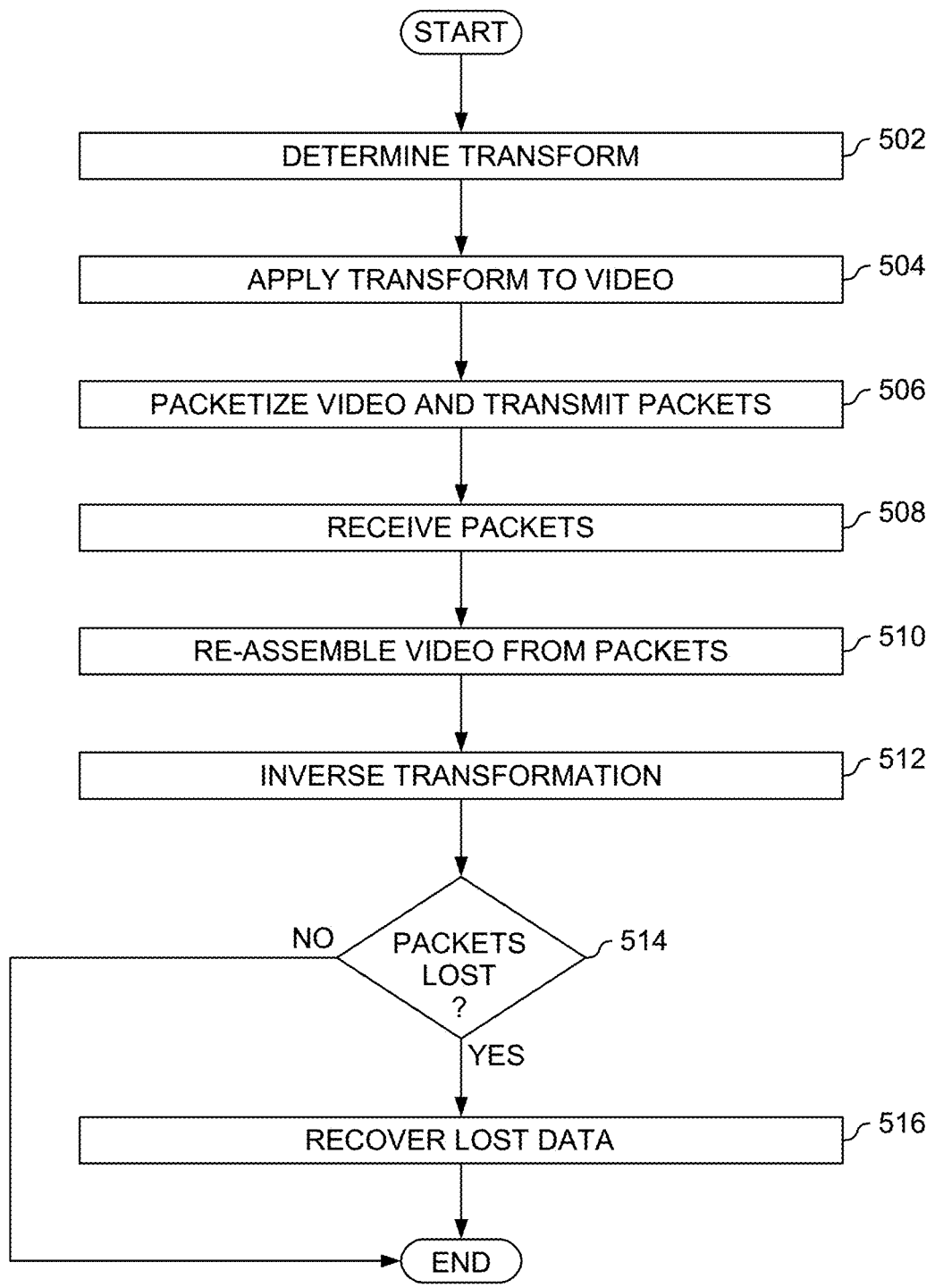
FIG. 5 is a flow chart illustrating resilient transmission of a video stream over an IP network, according to embodiments.

FIG. 5 is a flow chart illustrating resilient transmission of a video stream over an IP network, according to embodiments. At block 502, a transform is determined (e.g., the transform 310 illustrated in FIGS. 3 and 4). In an embodiment, the transform is selected based on several potential criteria, including the image resolution of the video frames and the packet size (e.g., the number of pixels per packet). According to this embodiment, the goal when selecting the transform is to increase the minimum distance between two adjacent pixels in a packet.

As one example, assume the video stream is transmitted using RTP. This is just one assumption, and other protocols could be used instead. The transform is selected to increase the minimum distance between adjacent pixels in the RTP packet, so that (as illustrated, for example, by the frames 302 and 312 in FIG. 3) an RTP packet includes pixels spread across the frame. This means that a given packet will have zero, or very few, neighboring pixels. If an individual packet is lost during network transmission, or a series of consecutive packets are lost, the lost data will be spread throughout the image, facilitating error recovery of the pixel information. In an embodiment, a threshold could be determined and used, such that the selected transform generates a minimum pixel distance above the threshold. For example, a threshold of 2 could be used, so that after transformation and packetization, any given packet includes pixels a distance of 2 apart.

As discussed above, any suitable transform can be used, so long as it meets the criteria. In an embodiment, a geometric transform could be used. One example is the Arnold's Cat Map linear transform. The Arnold's Cat Map transform is suitable because it can be easily parallelized (for example, using GPUs), is relatively simple no matter the content of the source image, and is very light and fast in terms of CPU and memory usage. This can be particularly important for a live or real-time transmission, where the transform operates very rapidly. In an embodiment, if the Arnold's Cat Map transform is used, at block 502 the number of iterations can be determined for a given frame resolution and packet size. For example, given a frame resolution of 1920×1080, eleven iterations might be suitable.

In an embodiment, at block 502 the transform is determined offline prior to transmission of a video stream. Because the transform depends on the image resolution and packet size, which typically remain constant within a given video stream, the transform can be selected before transmission and then used throughout the video stream. The result of selecting the transform is effectively a one-to-one mapping of the pixels in the original frame (e.g., the frame 302) to a location in the transformed frame (e.g., the transformed frame 312). This one-to-one mapping can be determined prior to transmission, and then saved in a suitable electronic storage location and used for subsequent frame transmissions. The inverse of the mapping can then be used to re-create the image (e.g., to re-create the frame 332 from the transformed frame 322). In an embodiment, the transform can be selected manually by a user prior to transmission. Alternatively, the transform could be selected automatically (e.g., by the video transformation module 124) based on supplied parameters (e.g., the image resolution and packet size).

At block 504, the video transformation module (e.g., the video transformation module 124) applies the transform to the video stream. This is discussed in more detail with regard to FIG. 6. At block 506, the communication module (e.g., the communication module 114) packetizes the video stream and transmits the packets from a source (e.g., the video source server 110) to a destination (e.g., the video processing server 130) over a communication network (e.g., the studio IP network 102).

For video streams in a progressive format (e.g. the European 1080p25 standard), this is sufficient. For interlaced formats, such as 1080i50, a video frame is transmitted in two halves. The first half represents the odd scan lines and the second half represents the even scan lines. The techniques discussed and illustrated in one or more embodiments herein can be applied to interlaced formats as well, with suitable modifications to account for the differences in transmission.

At block 508, the destination (e.g., the video processing server 130) receives the packets (e.g., at the communication module 134). At block 510, the communication module (e.g., the communication module 134) re-assembles the video frame based on the received packets (e.g., using RTP or another suitable protocol). At block 512, the video recovery module (e.g., the video recovery module 144) performs the inverse transform (e.g., the inverse transform 330 illustrated in FIG. 3) to re-create the original video frame.

At block 514, the communication module (e.g., the communication module 134) or the video recovery module (e.g., the video recovery module 144) determines whether packets were lost during transmission of the video stream. If no packets were lost, the flow ends. If packets were lost, at block 516 the missing data is recovered. In an embodiment, the missing data is pixel data for some of the pixels in the recovered video frame (e.g., as illustrated in frame 332 in FIG. 3 and frame 432 in FIG. 4). This data can be recovered using any suitable technique, as is known to people of skill in the art. For example, the color and luma values for pixels lost during transmission can be recovered based on the color and luma values of surrounding pixels.

Figure 6:
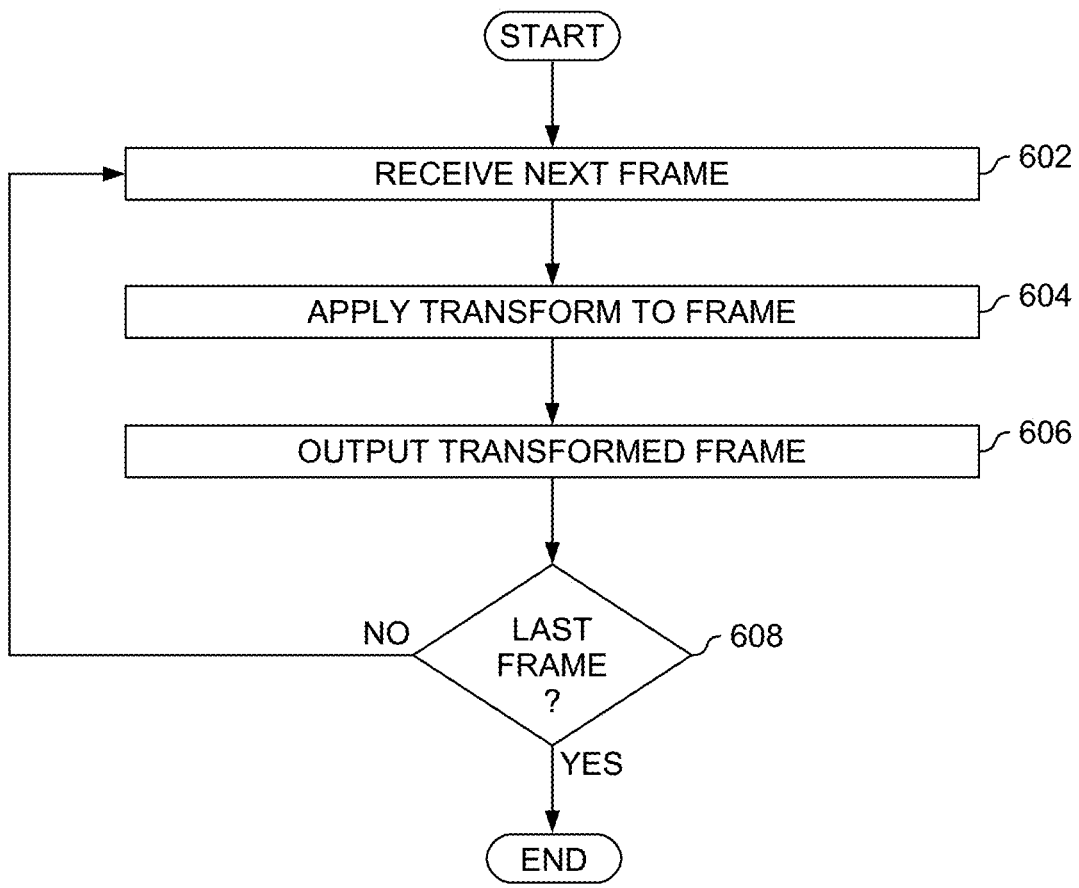
FIG. 6 is a flow chart illustrating transformation of a frame during resilient transmission of a video stream over an IP network, according to embodiments.

FIG. 6 is a flow chart illustrating transformation of a frame during resilient transmission of a video stream over an IP network, according to embodiments. In an embodiment, FIG. 6 illustrates block 504 illustrated in FIG. 5. At block 602, the next frame in the video stream (e.g., the frame 302 illustrated in FIG. 3) is received at the video transformation module (e.g., the video transformation module 124 illustrated in FIG. 2).

At block 604, the video transformation module 124 applies the transform to the video frame (e.g., the video frame 302 illustrated in FIG. 3 is transformed to the video frame 312). At block 606, the video transformation module 124 outputs the transformed frame (e.g., to the communication module 114 for transmission to a destination). At block 608, the video transformation module 124 determines whether the last frame has been transformed. If yes, the flow ends. If not, the flow returns to block 602.

Figure 7:
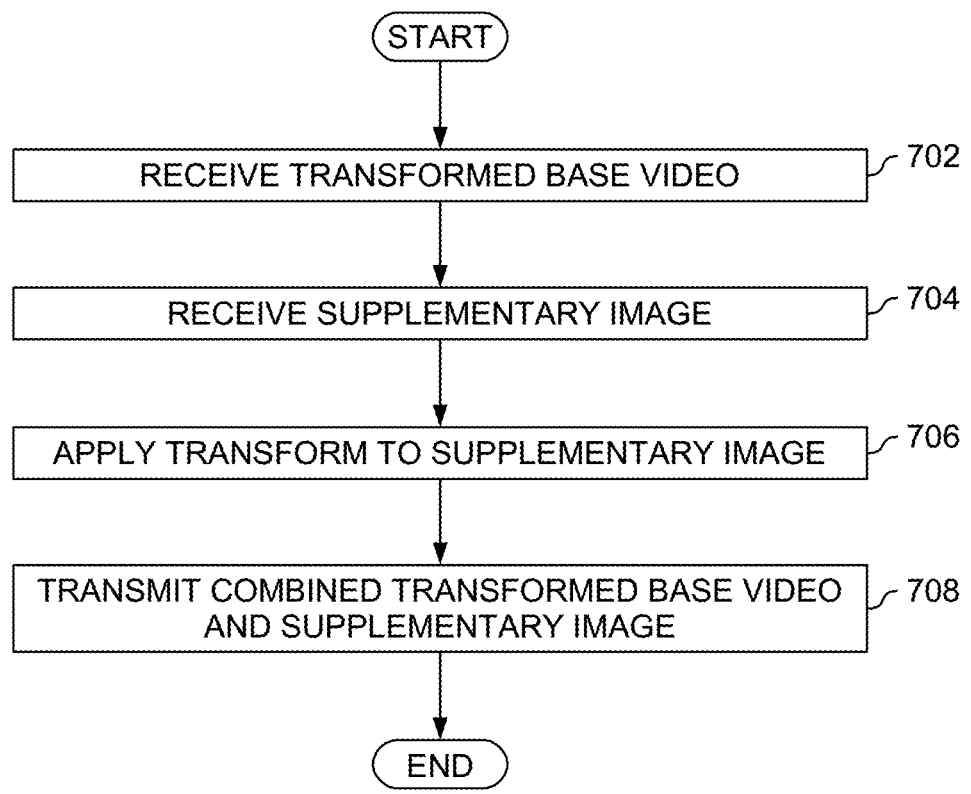
FIG. 7 is a flow chart illustrating resilient transmission of a base video stream and supplementary content, according to embodiments.

FIG. 7 is a flow chart illustrating resilient transmission of a base video stream and supplementary content, according to embodiments. At block 702, a video transformation module (e.g., the video transformation module 142 in the video processing server 130 illustrated in FIG. 2) receives a base video stream (e.g., from the video source server 110). In an embodiment, the video transformation module 124 in the video source server 110, illustrated in FIG. 2, has already transformed this base video stream. Alternatively, the video transformation module 142 in the video processing server 130, illustrated in FIG. 2, could transform the base video stream.

At block 704, the video processing server 130 receives a supplementary image to add into the base video received at block 702. For example, the video stream could depict a sporting event, and the supplementary image could be an advertising logo to display in the base video. As another example, the supplementary image could be a time and score box to display in the base video, or any other suitable supplementary image.

At block 706, the video transformation module 142 applies the transform to the supplementary image. In an embodiment, the video transformation module 142 applies the same transform to the supplementary image applied to the base video. Because the same transform is applied to the base video and the supplementary image, the transformed supplementary image can then simply be inserted into the transformed base video frame directly.

At block 708, the communication module (e.g., the communication module 134 in the video processing server 130) transmits the combined frame with both the transformed base video and the transformed supplementary image. For example, the communication module 134 transmits the transformed frame over the studio IP network 102 to one or additional devices 104 within the media production studio 100. The additional devices 104 can include a video recovery module, similar to the video recovery module 144 in the video processing server 130, and can re-create the image to allow further editing, observation, etc. The additional devices 104 can correct for any errors based on transmission loss (as discussed with regard to FIGS. 3-5), etc.

In the preceding, reference is made to embodiments presented in this disclosure. However, the scope of the present disclosure is not limited to specific described embodiments. Instead, any combination of the described features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

As will be appreciated by one skilled in the art, the embodiments disclosed herein may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium is any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described above with reference to flowchart illustrations and/or block diagrams of methods, apparatus (systems) and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

One or more embodiments may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g., an amount of storage space consumed by a user or a number of virtualized systems instantiated by the user). A user can access any of the resources that reside in the cloud at any time, and from anywhere across the Internet. In context of the present disclosure, a user may access applications (e.g., the video transformation module 124) or related data available in the cloud. For example, the video transformation module 124 could execute on a computing system in the cloud and transform the video stream before transmission. In such a case, the video transformation module could transform the video stream and store the transformed video at a storage location in the cloud. Doing so allows a user to access this information from any computing system attached to a network connected to the cloud (e.g., the Internet).

The flowchart and block diagrams in the Figures illustrate the architecture, functionality and operation of possible implementations of systems, methods and computer program products according to various embodiments. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In view of the foregoing, the scope of the present disclosure is determined by the claims that follow.

We claim:

1. A method comprising:
   receiving a plurality of data packets over a communications network, the plurality of data packets relating to a first source video portion transformed using a geometric transform, wherein the geometric transform is configured to modify a location of pixels in the first source video portion to increase a distance between pixels in a plurality of pairs of adjacent pixels in the first source video portion, such that the pixels in the plurality of pairs of adjacent pixels in the first source video portion are no longer adjacent after transformation;
   assembling a received video portion based on the plurality of data packets; and
   transforming the received video portion, using an inverse of the geometric transform, to generate a second source video portion, wherein the second source video portion and the first source video portion include a plurality of matching pixels.

2. The method of claim 1, further comprising:
   determining that at least one data packet relating to the first source video portion was lost during transmission over the communications network; and
   recreating pixel data in the second source video portion to compensate for the lost at least one packet.

3. The method of claim 2, wherein recreating pixel data further comprises:
   identifying a first pixel in the second source video portion with missing color values;
   selecting a plurality of reference pixels adjacent to the first pixel in the second source video portion; and
   determining the color value for the first pixel based on the color values of the plurality of reference pixels.

4. The method of claim 1, wherein the geometric transform increases the distance between the pixels in the plurality of pairs of adjacent pixels such that the previously adjacent pixels in the plurality of pairs of adjacent pixels have a distance above a pre-determined threshold distance after transformation.

5. The method of claim 1, wherein one or more individual packets in the plurality of data packets include pixel data for two or more pixels that are adjacent in a transformed first video source portion and are not adjacent in the first source video portion prior to transformation.

6. The method of claim 1, wherein the first source video portion comprises supplementary image data and base image data, and wherein the supplementary image data and the base image data are separately transformed, using the geometric transform, prior to transmission over the communications network.

7. The method of claim 1, wherein the first source video portion is part of a real-time video transmission.

8. The method of claim 1, wherein the communication network is an IP communication network, and wherein the data packets are received using Real-time Transport Protocol (RTP).

9. A system, comprising:
a processor; and
a memory storing a program, which, when executed on the processor, performs an operation, the operation comprising:
receiving a plurality of data packets over a communications network, the plurality of data packets relating to a first source video portion transformed using a geometric transform, wherein the geometric transform is configured to modify a location of pixels in the first source video portion to increase a distance between pixels in a plurality of pairs of adjacent pixels in the first source video portion, such that the pixels in the plurality of pairs of adjacent pixels in the first source video portion are no longer adjacent after transformation;
assembling a received video portion based on the plurality of data packets; and
transforming the received video portion, using an inverse of the geometric transform, to generate a second source video portion, wherein the second source video portion and the first source video portion include a plurality of matching pixels.

10. The system of claim 9, the operation further comprising:
determining that at least one data packet relating to the first source video portion was lost during transmission over the communications network; and
recreating pixel data in the second source video portion to compensate for the lost at least one packet.

11. The system of claim 10, wherein recreating pixel data further comprises:
identifying a first pixel in the second source video portion with missing color values;
selecting a plurality of reference pixels adjacent to the first pixel in the second source video portion; and
determining the color value for the first pixel based on the color values of the plurality of reference pixels.

12. The system of claim 9, wherein the geometric transform increases the minimum distance between the pixels in the plurality of pairs of adjacent pixels such that the previously adjacent pixels in the plurality of pairs of adjacent pixels have a distance above a pre-determined threshold distance after transformation.

13. The system of claim 9, wherein one or more individual packets in the plurality of data packets include pixel data for two or more pixels that are adjacent in a transformed first video source portion and are not adjacent in the first source video portion prior to transformation.

14. The system of claim 9, wherein the first source video portion comprises supplementary image data and base image data, and wherein the supplementary image data and the base image data are separately transformed, using the geometric transform, prior to transmission over the communications network.

15. A non-transitory computer program product, the computer program product comprising:
a computer-readable storage medium having computer-readable program code embodied therewith, the computer-readable program code executable by one or more computer processors to perform an operation, the operation comprising:
transforming a first source video portion using a geometric transform, wherein the geometric transform is configured to modify a location of pixels in the first source video portion to increase a distance between pixels in a plurality of pairs of adjacent pixels in the first source video portion, such that the pixels in the plurality of pairs of adjacent pixels in the first source video portion are no longer adjacent after transformation; and
transmitting a plurality of data packets, relating to the transformed first source video portion, over a communication network, wherein the plurality of data packets are configured to be received and used to generate a second source video portion using an inverse of the geometric transform, and wherein the second source video portion and the first source video portion include a plurality of matching pixels.

16. The non-transitory computer program product of claim 15, the operation further comprising:
determining that at least one data packet relating to the first source video portion was lost during transmission over the communications network; and
recreating pixel data in the second source video portion to compensate for the lost at least one packet.

17. The non-transitory computer program product of claim 15, wherein the geometric transform increases the distance between the pixels in the plurality of pairs of adjacent pixels such that the previously adjacent pixels in the plurality of pairs of adjacent pixels have a distance above a pre-determined threshold distance after transformation.

18. The non-transitory computer program product of claim 15, wherein one or more individual packets in the plurality of data packets include pixel data for two or more pixels that are adjacent in a transformed first video source portion and are not adjacent in the first source video portion prior to transformation.

19. The non-transitory computer program product of claim 15, wherein the first source video portion comprises supplementary image data and base image data, and wherein the supplementary image data and the base image data are separately transformed, using the geometric transform, prior to transmission over the communications network.

* * * * *

UNITED STATES PATENT AND TRADEMARK OFFICE
CERTIFICATE OF CORRECTION

PATENT NO. : 10,917,650 B2
APPLICATION NO. : 16/033112
DATED : February 9, 2021
INVENTOR(S) : Mohammed Hawari et al.

It is certified that error appears in the above-identified patent and that said Letters Patent is hereby corrected as shown below:

In the Claims

In Column 13, Line 54, in Claim 12, before "distance" delete "minimum".

Signed and Sealed this
Seventeenth Day of January, 2023

Katherine Kelly Vidal
*Director of the United States Patent and Trademark Office*